(12) United States Patent
Muraki et al.

(10) Patent No.: US 9,154,696 B2
(45) Date of Patent: Oct. 6, 2015

(54) IMAGING DEVICE FOR SYNCHRONIZED IMAGING

(71) Applicant: CASIO COMPUTER CO., LTD., Tokyo (JP)

(72) Inventors: Jun Muraki, Tokyo (JP); Shimpei Matsuda, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 184 days.

(21) Appl. No.: 13/845,052

(22) Filed: Mar. 17, 2013

(65) Prior Publication Data

US 2013/0242135 A1 Sep. 19, 2013

(30) Foreign Application Priority Data

Mar. 19, 2012 (JP) .................................. 2012-062737
Jul. 12, 2012 (JP) .................................. 2012-156396

(51) Int. Cl.
*H04N 5/232* (2006.01)

(52) U.S. Cl.
CPC ........... *H04N 5/23229* (2013.01); *H04N 5/232* (2013.01)

(58) Field of Classification Search
CPC .......... H04N 5/23203; H04N 5/23206; H04N 5/23229
See application file for complete search history.

(56) References Cited

U.S. PATENT DOCUMENTS

| | | | |
|---|---|---|---|
| 7,333,725 B1 * | 2/2008 | Frazier | 396/263 |
| 8,107,205 B2 | 1/2012 | Adachi | |
| 8,228,892 B2 | 7/2012 | Takahashi et al. | |
| 8,855,146 B2 | 10/2014 | Takahashi et al. | |
| 2009/0141138 A1 * | 6/2009 | DeAngelis | 348/220.1 |
| 2010/0289951 A1 * | 11/2010 | Ryu et al. | 348/500 |
| 2013/0063659 A1 * | 3/2013 | Takahashi | 348/521 |
| 2014/0002664 A1 * | 1/2014 | Hanabusa | 348/159 |
| 2014/0055613 A1 * | 2/2014 | Ohtomo et al. | 348/144 |
| 2014/0098185 A1 * | 4/2014 | Davari et al. | 348/36 |

FOREIGN PATENT DOCUMENTS

| | | |
|---|---|---|
| JP | 2002271673 A | 9/2002 |
| JP | 2002-344800 A | 11/2002 |
| JP | 2003-324649 A | 11/2003 |
| JP | 2005223821 A | 8/2005 |
| JP | 2006217326 A | 8/2006 |
| JP | 2007019960 A | 1/2007 |
| JP | 2007208903 A | 8/2007 |

(Continued)

OTHER PUBLICATIONS

Japanese Office Action dated Dec. 9, 2014, issued in counterpart Japanese Application No. 2012-156396.

(Continued)

*Primary Examiner* — Timothy J Henn

(74) *Attorney, Agent, or Firm* — Holtz, Holtz, Goodman & Chick PC

(57) ABSTRACT

An imaging device is equipped with an imaging section and is provided with a reception section and an imaging control section. The reception section receives a GPS signal from a GPS satellite, which includes reference time information that is used as a reference of time. The imaging control section synchronizes a timing of imaging by the imaging section with a reference time on the basis of the reference time information included in the GPS signal received by the reception section.

19 Claims, 8 Drawing Sheets

(56) References Cited

FOREIGN PATENT DOCUMENTS

| | | |
|---|---|---|
| JP | 2009-147597 A | 7/2009 |
| JP | 2009177313 A | 8/2009 |
| JP | 2010279235 A | 12/2010 |

OTHER PUBLICATIONS

Japanese Office Action (and English translation thereof) dated Apr. 14, 2015, issued in counterpart Japanese Application No. 2012-156396.

* cited by examiner

IMAGING DEVICE FOR SYNCHRONIZED IMAGING

This application is based on and claims the benefit of priority from Japanese Patent Application Nos. 2012-062737 and 2012-156396, respectively filed on 19 Mar. 2012 and 12 Jul. 2012, the contents of which are incorporated herein by reference.

BACKGROUND OF THE INVENTION

1. Field of the Invention

The present invention relates to an imaging device, an imaging method and a program for performing imaging in synchronization with another device.

2. Related Art

Recently, digital cameras have become capable of successive imaging at high frame rates, exceeding 100-1000 fps (frames per second). In some cases, a digital camera performs successive imaging at one of these high frame rates in synchronization with another digital camera. In such a case, for frames captured by the successive imaging to be captured with matching timings by the different digital cameras, the digital cameras must be synchronized with one another to a precision between a hundredth of a second and a thousandth of a second.

However, when signals that synchronize imaging timings are exchanged between plural digital cameras, errors of more than a hundredth of a second occur between transmission times identified by a transmission side camera and reception times identified by a reception side camera. If plural digital cameras are synchronized by respective built-in quartz clocks with an accuracy of around 15 seconds per month, differences arise at around 0.02 seconds per hour.

A technology has been proposed (for example, Japanese Unexamined Patent Publication No. 2002-344800) in which a light detector and a signal controller are provided at each of imaging devices or each except one of imaging devices. The light detector detects a flash light emission, and the signal controller initializes the timing of frame synchronization signals in response to the detection of the flash light emission. Thus, using the flash light emission as a cue, imaging operations of all the imaging devices are synchronized.

SUMMARY OF THE INVENTION

One aspect of the present invention is an imaging device including:

an imaging section;

a reception section that receives a GPS signal from a GPS satellite, the GPS signal including reference time information that is a reference of time; and an imaging control section that synchronizes a timing of imaging by the imaging section with a reference time on the basis of the reference time information included in the GPS signal received by the reception section.

Another aspect of the present invention is an imaging method executed by an imaging device provided with an imaging section, the imaging method including:

a receiving step of receiving a GPS signal from a GPS satellite, the GPS signal including reference time information that is a reference of time; and an imaging control step of synchronizing a timing of imaging by the imaging section with a reference time on the basis of the reference time information included in the GPS signal received in the receiving step.

Another aspect of the present invention is a non-transitory computer readable storage medium having stored therein a program executable by a computer provided at an imaging device that is provided with an imaging section, the program causing the computer to execute:

a receiving step of receiving a GPS signal from a GPS satellite, the GPS signal including reference time information that is a reference of time; and an imaging control step of synchronizing a timing of imaging by the imaging section with a reference time on the basis of the reference time information included in the GPS signal received in the receiving step.

Another aspect of the present invention is an imaging device including:

an imaging section;

a reference time signal reception section that receives a reference time signal that is a reference of time from externally;

an imaging control section that synchronizes a timing of imaging by the imaging section with a reference time on the basis of the reference time signal received by the reference time signal reception section;

a synchronization signal generation section that generates a periodic synchronization signal synchronized with the reference time to match a timing at which the reference time signal reception section receives the reference time signal from externally; and an imaging instruction signal generation section that generates a synchronized imaging instruction signal that instructs imaging, the timing of imaging being synchronized, wherein, when the imaging control section acquires the synchronized imaging instruction signal generated by the imaging instruction signal generation section of the present imaging device or another of the imaging device, the imaging control section sets the synchronized timing of imaging of image data by the imaging section to match the synchronization signal generated by the synchronization signal generation section.

Another aspect of the present invention is an imaging method executed by an imaging device provided with an imaging section, the imaging method including:

a reference time signal reception step of receiving a reference time signal that is a reference of time from externally;

an imaging control step of synchronizing a timing of imaging by the imaging section with a reference time on the basis of the reference time signal received in the reference time signal reception step;

a synchronization signal generation step of generating a periodic synchronization signal synchronized with the reference time to match a timing at which the reference time signal is received from externally in the reference time signal reception step; and an imaging instruction signal generation step of generating a synchronized imaging instruction signal that instructs imaging, the timing of imaging being synchronized, wherein the imaging control step includes a step of, when the synchronized imaging instruction signal generated in the imaging instruction signal generation step of the present imaging device or another of the imaging device is acquired, setting the synchronized timing of imaging of image data by the imaging section to match the synchronization signal generated in the synchronization signal generation step.

Another aspect of the present invention is a non-transitory computer readable storage medium having stored therein a program executable by a computer provided at an imaging device that is provided with an imaging section, the program causing the computer to execute:

a reference time signal reception step of receiving a reference time signal that is a reference of time from externally;

an imaging control step of synchronizing a timing of imaging by the imaging section with a reference time on the basis of the reference time signal received in the reference time signal reception step;

a synchronization signal generation step of generating a periodic synchronization signal synchronized with the reference time to match a timing at which the reference time signal is received from externally in the reference time signal reception step; and an imaging instruction signal generation step of generating a synchronized imaging instruction signal that instructs imaging, the timing of imaging being synchronized, wherein the imaging control step includes a step of, when the synchronized imaging instruction signal generated in the imaging instruction signal generation step of the present imaging device or another of the imaging device is acquired, setting the synchronized timing of imaging of image data by the imaging section to match the synchronization signal generated in the synchronization signal generation step.

DETAILED DESCRIPTION OF THE INVENTION

First Embodiment

In the following, a first embodiment of the present invention will be explained with reference to the drawings.

Structure

Figure 1:
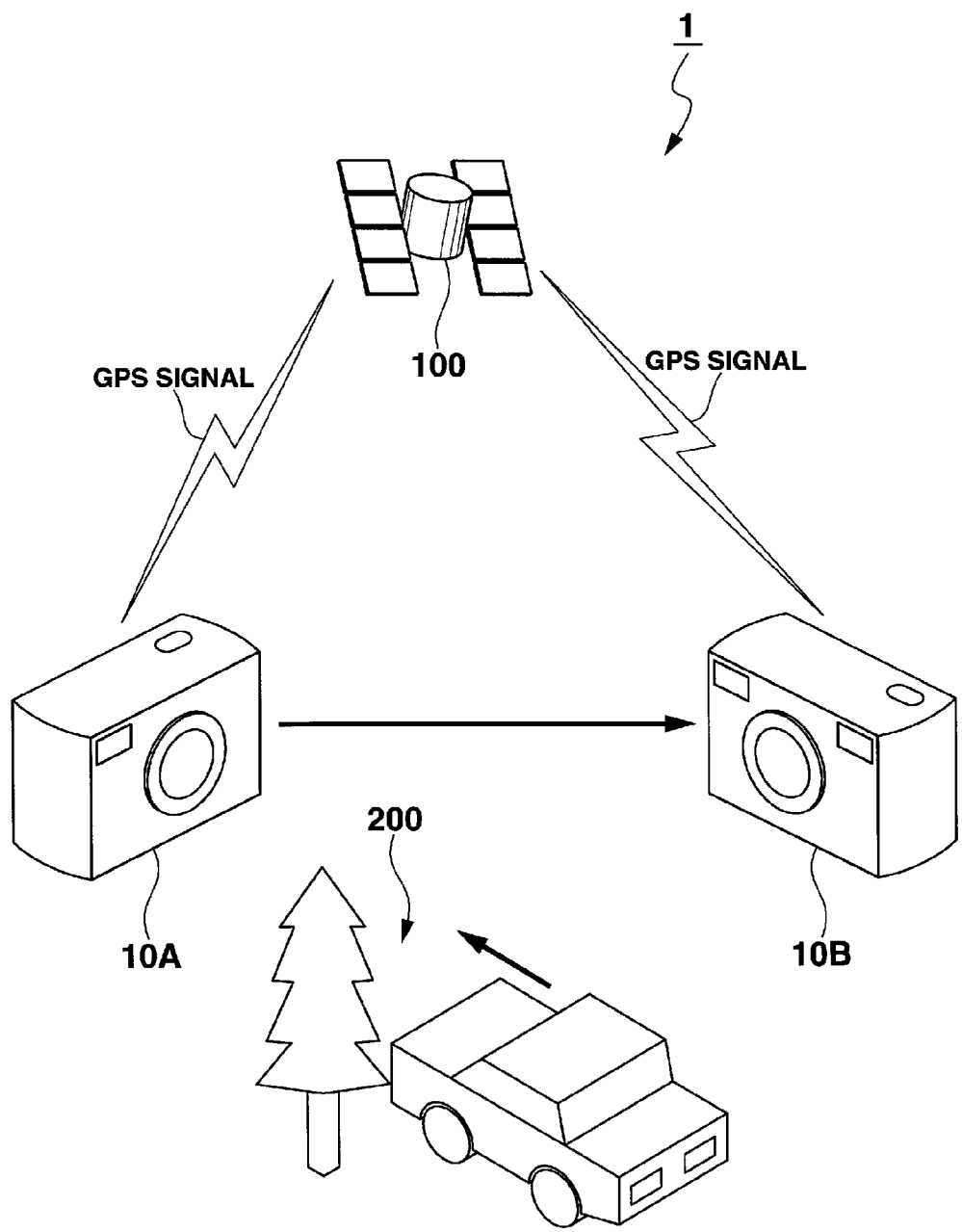
FIG. 1 is a diagram showing a system structure of an imaging system that is a first embodiment in accordance with the present invention.

FIG. 1 is a diagram showing a system structure of an imaging system 1 that is the first embodiment in accordance with the present invention.

The imaging system 1 is equipped with a plural number of imaging devices that transmit and receive signals for synchronizing imaging timings and instructing imaging (which are hereinafter referred to as "synchronized imaging instruction signals") between one another, and that carry out the imaging.

In the present embodiment, the plural imaging devices are constituted by an imaging device 10A at a side of transmission of the synchronized imaging instruction signals (hereinafter referred to as the "master side") and an imaging device 10B at a side of reception of the synchronized imaging instruction signals (hereinafter referred to as the "slave side"). The meaning of the term "synchronized imaging" as used in the present embodiment includes the synchronization of timings and execution of image processing at plural imaging devices.

In the first embodiment, the imaging device 10A acts as the master side imaging device and the imaging device 10B acts as the slave side imaging device, but this is not limiting. A configuration is possible in which the imaging device 10B acts as the master side imaging device and the imaging device 10A acts as the slave side imaging device.

The imaging devices 10A and 10B may be constituted by, for example, digital cameras.

The imaging devices 10A and 10B respectively receive the same GPS signals, which are reference time signals from (a) global positioning system (GPS) satellite/satellites 100. The reference time signals serve as references for timings of execution of the synchronized imaging processing (which is described below). The imaging devices 10A and 10B respectively generate frame synchronization signals synchronized with the GPS signals, and respectively image an imaging object 200 in time with the frame synchronization signals.

Thus, the imaging system 1 may output plural sets of image data in which the imaging object 200 is imaged from respectively different angles at the same time. The imaging object 200 may be, for example, an object moving at a high speed or a momentary physical phenomenon. By performing synchronized imaging with reference to GPS signals, the imaging system 1 may synchronize imaging timings with high precision.

Now, hardware structures of the imaging devices 10A and 10B are described.

In the present embodiment, the imaging devices 10A and 10B are equipped with the same hardware structures. Therefore, in the following descriptions, where there is no need to distinguish between the individual imaging devices 10A and 10B, the imaging devices 10A and 10B are referred to in common as the imaging device(s) 10.

Figure 2:
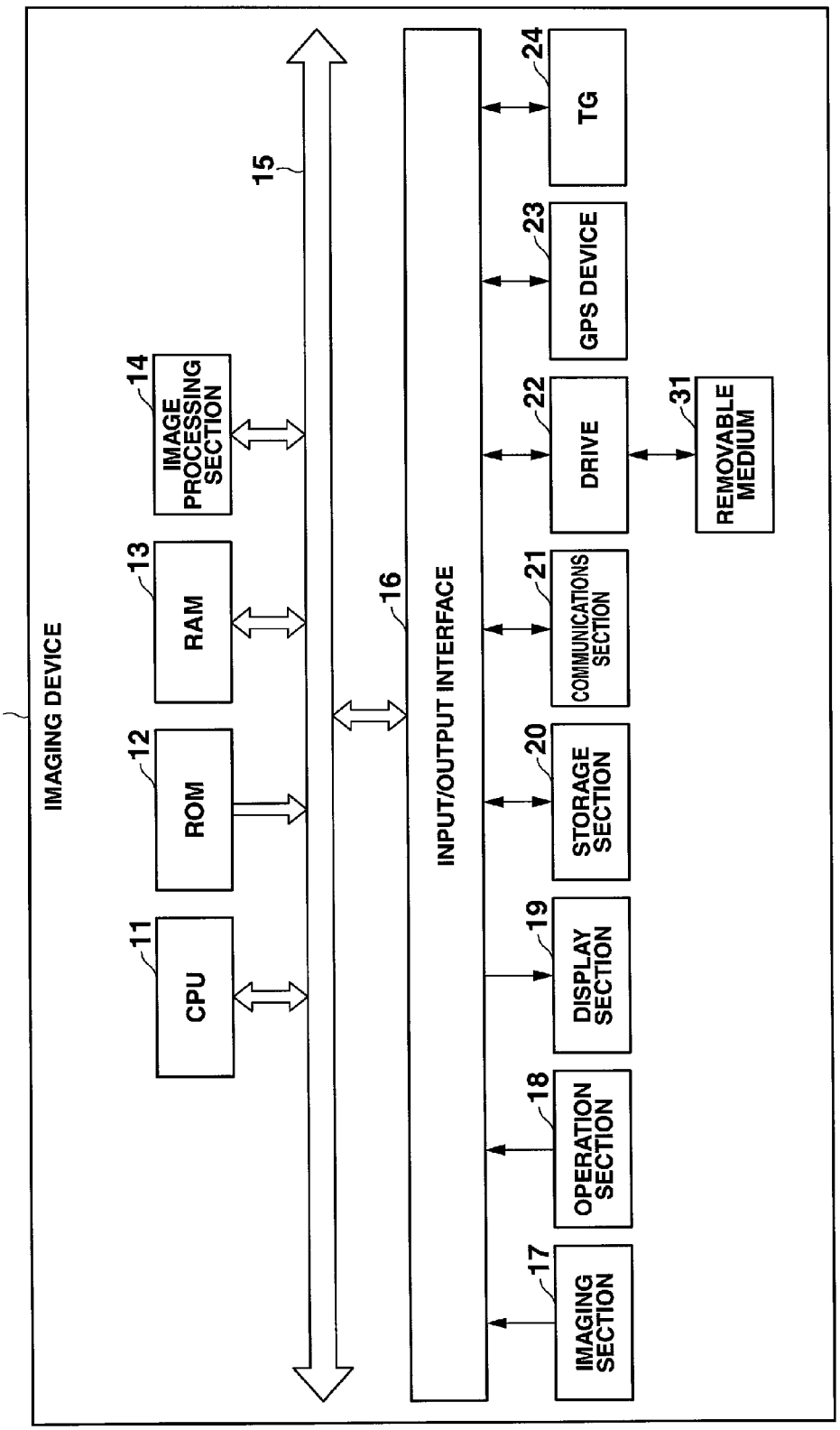
FIG. 2 is a block diagram showing hardware structures of an imaging device in accordance with the first embodiment.

FIG. 2 is a block diagram showing hardware structures of each imaging device 10 in accordance with the first embodiment.

The imaging device 10 is provided with a central processing unit (CPU) 11, a read-only memory (ROM) 12, a random access memory (RAM) 13, an image processing section 14, a bus 15, an input/output interface 16, an imaging section 17, an operation section 18, a display section 19, a storage section 20, a communications section 21, a drive 22, a GPS device 23 and a timing generator (referred to as "the TG" hereinafter) 24.

The CPU 11 executes various processes in accordance with a program recorded in the ROM 12 or a program loaded into the RAM 13 from the storage section 20.

Data and suchlike that is required for execution of the various processes by the CPU 11 is stored in the RAM 13 as appropriate.

The image processing section 14 is constituted by a digital signal processor (DSP) and a video random access memory (VRAM) or the like, and works together with the CPU 11 to apply various kinds of image processing to data of images.

In the present embodiment, a unit of the processing of images by the imaging device 10 is a single frame; specifically, one frame of a video image constituted by a plural number of frames (a live preview image, which is described below). That is, in the present embodiment, synchronized imaging is performed for each of the frames constituting a video image.

For example, the image processing section 14 applies image processing that includes noise reduction, white balancing and correction of blurring caused by hands or the like to image data outputted from the imaging section 17, which is described below.

The CPU 11, the ROM 12, the RAM 13 and the image processing section 14 are connected to one another via the bus 15. The bus 15 is also connected with the input/output interface 16. The imaging section 17, the operation section 18, the display section 19, the storage section 20, the communications section 21, the drive 22, the GPS device 23 and the TG 24 are connected to the input/output interface 16.

The imaging section 17 is provided with an optical lens unit and an image sensor, which are not shown in the drawings.

The optical lens unit is configured with lenses that focus light for imaging objects, e.g., a focusing lens and a zoom lens or the like.

The focusing lens is a lens for forming an image of an object on a light detection surface of the image sensor. The zoom lens is a lens for freely varying the focusing distance within a predetermined range.

The optical lens unit also includes peripheral circuits for adjusting setting parameters, such as focus, exposure, white balance and the like, as necessary.

The image sensor is configured with an photoelectric conversion component, an AFE (Analog Front End), and the like.

The photoelectric conversion component is configured by, for example, a CMOS-based (complementary metal oxide semiconductor) photoelectric conversion component or the like. An image of an object is incident on the photoelectric conversion component through the optical lens unit. Hence, on the basis of a frame synchronization signal generated by the TG 24, which is described below, the photoelectric conversion component performs photoelectric conversion (imaging) of the object and accumulates image signals over predetermined durations, and the photoelectric conversion component successively provides the accumulated image signals to the AFE in the form of analog signals.

The AFE applies various kinds of signal processing such as analog-to-digital (A/D) conversion processing and the like to the analog image signals. The various kinds of signal processing generate digital signals, which are outputted as output signals from the imaging section 17.

Hereinafter, the output signals of the imaging section 17 are referred to as "image data". Thus, image data is outputted from the imaging section 17 and provided as appropriate to the CPU 11, the image processing section 14 and the like.

The operation section 18 is structured with various buttons and the like, including a shutter button, and accepts instruction operations from a user.

The display section 19 is structured with a liquid crystal display or the like and displays various images.

The storage section 20 is an example of a storage section and is structured with dynamic random access memory (DRAM) or the like. The storage section 20 temporarily stores image data outputted from the image processing section 14 and the like. The storage section 20 also stores various kinds of data required for processing at the image processing section 14 and the like. The storage section 20 also stores the counter value of a frame counter that is incremented by an imaging control section 41, which is described below, when the frame synchronization signal is generated by the below-described TG 24. A ring buffer that sequentially stores a predetermined number of sets of image data (for example, 10 frames) is formed in the storage section 20.

The communications section 21 transmits and receives various signals to and from the other imaging device 10, for example, by short-distance wireless communications, infrared wireless communications or the like.

The drive 22 is an example of a recording section. A removable medium 31, such as a magnetic disc, an optical disc, a magneto-optical disc, a semiconductor memory or the like, is loaded at the drive 22 as appropriate. As required, programs read from the removable medium 31 by the drive 22 are installed in the storage section 20. Similarly to the storage section 20, the removable medium 31 may also store the various kinds of data such as image data and the like that are stored in the storage section 20.

The GPS device 23 is an example of a reference signal receiving section, and receives GPS signals (reference time signals) from the GPS satellite 100 (see FIG. 1). On the basis of standard time signals included in the GPS signals and timings at which the GPS signals are received, the GPS device 23 synchronizes with the standard time and outputs GPS pulses with a constant period (hereinafter, specifically if the period is 1 second, the GPS pulses are referred to as "the PPS signal" where appropriate). More specifically, the GPS device 23 includes a clock that generates standard time information from the GPS signals and keeps time. On the basis of this clock, a GPS pulse is outputted at each cycle of a predetermined duration, for example, at the startpoint of each second (n min:m.00 sec, in which "n" and "m" represent arbitrary integers).

This predetermined duration (constant period) is a value decided in advance in each imaging device 10 but may be another value, provided the duration is longer by a sufficient margin than a duration from when information is exchanged between the imaging devices 10 until required processing can be started. Because the standard time included in the GPS signals is used for the clocking time, the time is common between the imaging devices 10.

That is, the respective GPS devices 23 suitably acquire the GPS satellite 100 and receive the same GPS signals, and the imaging devices 10A and 10B generate GPS pulses with matching periods and matching times (generating new GPS pulses or correcting the times and timings of already generated GPS pulses). Each GPS device 23 sends the GPS pulses to the CPU 11 and the TG 24.

Figure 3:
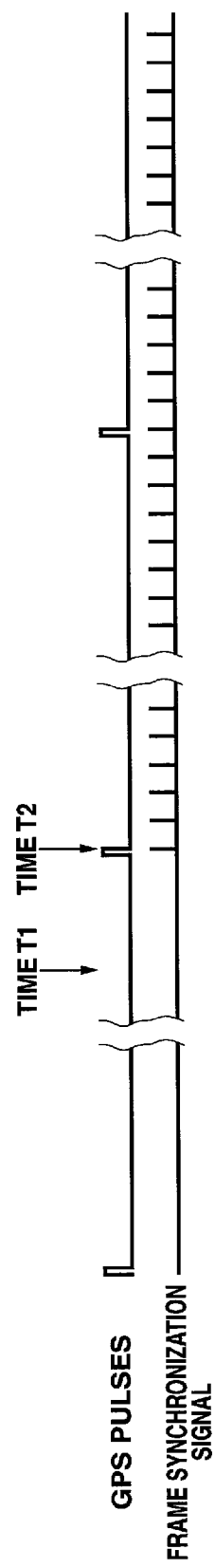
FIG. 3 is a diagram describing a relationship between GPS pulses (a time synchronization signal) and a frame synchronization signal in accordance with the first embodiment.

FIG. 3 is a diagram describing a relationship between the GPS pulses (a time synchronization signal) and a frame synchronization signal in accordance with the first embodiment.

The TG 24 is an example of a synchronization signal generating section. The TG 24 is controlled by the CPU 11, starts the generation of the frame synchronization signal to match a GPS pulse outputted from the GPS device 23, and repeatedly generates the frame synchronization signal at a predetermined period. The TG 24 includes a clock division circuit for generating the frame synchronization signal with a predetermined number of cycles between two GPS pulses (in 1.00 seconds).

That is, the TGs 24 of the imaging devices 10A and 10B respectively generate frame synchronization signals to match the GPS pulses, which are outputted with identical timings. Thus, frame synchronization signals with identical periods that are started at identical timings are cyclically generated in the imaging devices 10A and 10B.

Each TG 24 outputs the generated frame synchronization signal to the imaging section 17.

Figure 4:
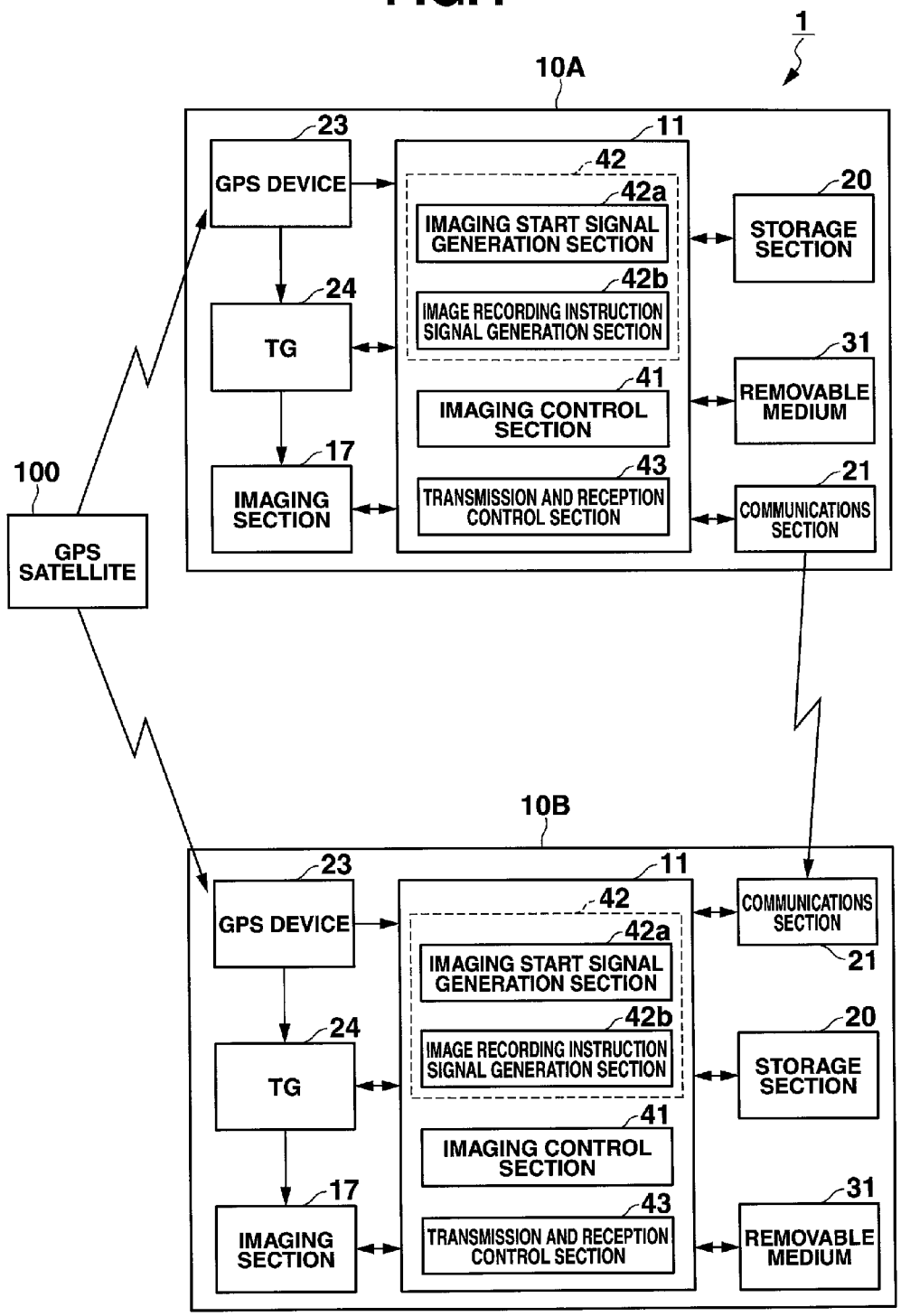
FIG. 4 is a functional block diagram showing functional structures for the execution of synchronized imaging processing by the imaging system in accordance with the first embodiment.

FIG. 4 is a functional block diagram showing functional structures for the execution of synchronized imaging processing by the imaging system 1 of FIG. 1.

In FIG. 4, of the structures of the imaging devices 10A and 10B according to FIG. 2, only each CPU 11, imaging section 17, storage section 20, GPS device 23, TG 24 and removable medium 31 are shown.

Herebelow, where neither the imaging device 10A or imaging device 10B is clearly indicated, the common functional structures of the imaging devices 10A and 10B are being described.

When controlling the execution of the synchronized imaging processing, the CPU 11 functions as the imaging control section 41, an image instruction signal generation section 42 and a transmission and reception control section 43.

The imaging control section 41 sequentially outputs image data to the imaging section 17, matching the frame synchronization signal generated by the TG 24. Specifically, the imaging control section 41 executes live preview imaging processing and live preview display processing simultaneously with the start of generation of the frame synchronization signal.

In other words, the imaging control section 41 causes imaging operations by the imaging section 17 to continue in time with the frame synchronization signal. In the present embodiment, the imaging control section 41 outputs one frame of image data to the imaging section 17 each time the frame synchronization signal is generated by the TG 24.

The imaging control section 41 resets the frame counter stored in the storage section 20 in accordance with the start of synchronized imaging, and increments the counter value of the frame counter each time the frame synchronization signal is generated by the TG 24, that is, each time one frame of image data is outputted from the imaging section 17. The counter values of the frame counter represent serial numbers of the imaged frames, counting from the start of synchronized imaging.

In accordance with the incrementing of the counter value of the frame counter while imaging operations by the imaging section 17 are being continued, the imaging control section 41 updates an image data storage address in the ring buffer of the storage section 20 to the next address, associates the image data sequentially outputted by the imaging section 17 with the counter value of the frame counter, and temporarily stores the same to the updated ring buffer address. This sequence of control processing is referred to as "live preview imaging processing" herein.

The imaging control section 41 sequentially reads out the data of captured images that has been temporarily recorded in the ring buffer during the live preview imaging processing, and executes control to sequentially display the captured images at the display section 19. This sequence of control processing is referred to herein as "live preview display processing", and the captured images displayed at the display section 19 by the live preview display processing are referred to herein as "live preview images".

A user may decide on image composition while looking at the live preview images and, as an operation instructing recording of a captured image, press the shutter button of the operation section 18 all the way down. This operation of pressing the shutter button all the way down is referred to hereinafter as a "full press operation" or simply a "full press".

Now, if autofocus (AF) processing or the like is to be executed at the imaging device 10A before the full press operation, the user may perform an operation of pressing the shutter button of the operation section 18 partway down (to a predetermined position that is not all the way down). This operation of pressing the shutter button partway down (to a predetermined position that is not all the way down) is referred to hereinafter as a "half press operation" or simply a "half press".

If the image instruction signal generation section 42 is operating at the master side, the image instruction signal generation section 42 generates synchronized imaging instruction signals (an imaging start signal and an image recording instruction signal, which are described below) for synchronizing imaging timings and instructing imaging, and operates in conjunction with the transmission and reception control section 43 to transmit the synchronized imaging instruction signals to the other imaging device. If the image instruction signal generation section 42 is operating at the slave side, the image instruction signal generation section 42 operates in conjunction with the transmission and reception control section 43 to receive the synchronized imaging instruction signals from the other imaging device.

In the present embodiment, the image instruction signal generation section 42 of the imaging device 10A generates the synchronized imaging instruction signals and transmits the synchronized imaging instruction signals to the imaging device 10B, and the image instruction signal generation section 42 of the imaging device 10B receives the synchronized imaging instruction signals from the imaging device 10A.

Each image instruction signal generation section 42 is provided with an imaging start signal generation section 42a and an image recording instruction signal generation section 42b.

If the imaging start signal generation section 42a is operating at the master side, the imaging start signal generation section 42a generates a synchronized imaging instruction signal that initiates the start of live preview imaging processing by the imaging section 17 (hereinafter referred to where appropriate as an "imaging start signal"), in accordance with a GPS pulse outputted by the GPS device 23, and operates in conjunction with the transmission and reception control section 43 to transmit the imaging start signal to the other imaging device. If the imaging start signal generation section 42a is operating at the slave side, the imaging start signal generation section 42a operates in conjunction with the transmission and reception control section 43 to receive the imaging start signal from the other imaging device.

In the present embodiment, the imaging start signal generation section 42a of the imaging device 10A generates the imaging start signal and transmits the imaging start signal to the imaging device 10B, and the imaging start signal generation section 42a of the imaging device 10B receives the imaging start signal from the imaging device 10A.

After a predetermined duration has passed from the imaging start signal generation section 42a generating the imaging start signal or receiving the imaging start signal from the other imaging device, the TG 24 starts the generation of the frame synchronization signal, matching the GPS pulses outputted by the GPS device 23.

That is, the TG 24 of the imaging device 10A starts the generation of the frame synchronization signal after the predetermined duration has passed from the imaging start signal generation section 42a generating the imaging start signal, and the TG 24 of the imaging device 10B starts the generation of the frame synchronization signal after the predetermined duration has passed from the imaging start signal being received from the imaging device 10A.

To be specific, the TG 24 starts the generation of the frame synchronization signal in time with the first GPS pulse that is outputted by the GPS device 23 after the imaging start signal generation section 42a generates the imaging start signal or after the imaging start signal is received from the other imaging device.

For example, giving a description with the example in FIG. 3, if the imaging start signal generation section 42a generates or receives the imaging start signal at a time T1 in FIG. 3, the TG 24 starts the generation of the frame synchronization signal to match the first GPS pulse that is outputted thereafter (time T2 in FIG. 3).

If the image recording instruction signal generation section 42b is operating at the master side, when the shutter button is fully pressed by the user, the image recording instruction signal generation section 42b generates a synchronized imaging instruction signal that initiates the recording of image data (hereinafter referred to where appropriate as an "image recording instruction signal"), and operates in conjunction with the transmission and reception control section 43 to transmit the image recording instruction signal to the other imaging device. If the image recording instruction signal generation section 42b is operating at the slave side, the image recording instruction signal generation section 42b operates in conjunction with the transmission and reception control section 43 to receive the image recording instruction signal from the other imaging device.

In the present embodiment, the image recording instruction signal generation section 42b of the imaging device 10A generates the image recording instruction signal and transmits the image recording instruction signal to the imaging device 10B, and the image recording instruction signal generation section 42b of the imaging device 10B receives the image recording instruction signal from the imaging device 10A.

The image recording instruction signal generation section 42b includes the counter value of the frame counter that corresponds to the image data to be recorded (hereinafter referred to where appropriate as the recording instruction frame number) in the image recording instruction signal, and transmits the same to the other imaging device.

When the image recording instruction signal is generated or received, the imaging control section 41 executes control to apply predetermined image processing with the image processing section 14 to the captured image data outputted from the imaging section 17 and record the data to the removable medium 31.

Specifically, when the image recording instruction signal is received by the image recording instruction signal generation section 42b or the image recording instruction signal is received from the other imaging device, the imaging control section 41 reads image data corresponding to the recording instruction frame number from the ring buffer of the storage section 20 and records the image data to the removable medium 31 serving as a recording section.

The "recording instruction frame number" here is the counter value of the frame counter when the image recording instruction signal is generated, or a counter value that is decremented by a predetermined number from the counter value of the frame counter when the image recording instruction signal is generated, or a counter value that is incremented by a predetermined number from the counter value of the frame counter when the image recording instruction signal is generated. That is, depending on a setting, the imaging control section 41 may record image data from when the shutter button is fully pressed, may record image data from a frame several frames before the shutter button is fully pressed, or may record image data from a frame several frames after the shutter button is fully pressed.

Herebelow, where images for live preview imaging processing and live preview display processing should be distinguished, the image at the time for which recording is instructed by the full press operation is referred to where appropriate as the "image for recording".

The transmission and reception control section 43 controls the communications section 21 and works in conjunction with the imaging start signal generation section 42a to transmit the imaging start signal to the other imaging device or to receive the imaging start signal from the other imaging device. The transmission and reception control section 43 also controls the communications section 21 and works in conjunction with the image recording instruction signal generation section 42b to transmit the image recording instruction signal to the other imaging device or to receive the image recording instruction signal from the other imaging device.

Now, of processing in the imaging system 1, the synchronized imaging processing that is executed by these functional structures of FIG. 4 is described with reference to FIG. 5.

Figure 5:
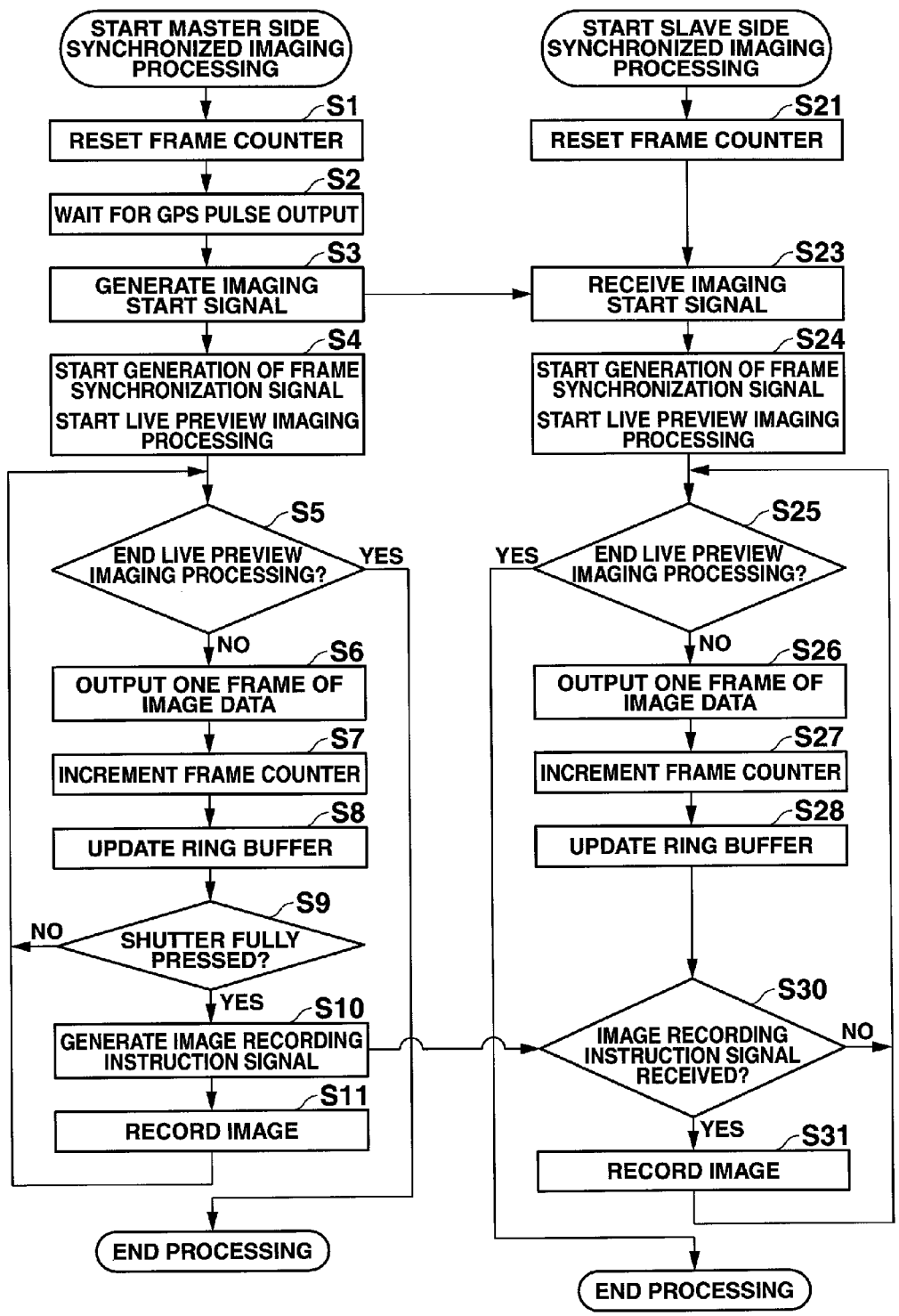
FIG. 5 is a flowchart describing the flow of the synchronized imaging processing executed by the imaging system in accordance with the first embodiment.

FIG. 5 is a flowchart describing the flow of the synchronized imaging processing executed by the imaging system 1 of FIG. 4.

In the synchronized imaging processing in FIG. 5, the GPS devices 23 of the imaging device 10A (the master side) and the imaging device 10B (the slave side) acquire the GPS satellite 100 (see FIG. 1). In a state in which the GPS signals from the GPS satellite 100 can be acquired, both the GPS devices 23 start the generation of GPS pulses with matching periods and matching times (or complete corrections of times and timings). This is performed when the imaging devices are switched into an imaging mode.

This reception of GPS signals for starting the generation of GPS pulses (or correcting the times and timings) is carried out at each time of imaging when a usual GPS function (a function that adds position information of the time of imaging to captured image data and stores the same) is in effect. However, even when the usual GPS function is turned off to save energy, the reception of GPS signals can be carried out at intervals such that errors in the times and timings do not exceed predetermined levels. It is desirable to carry this out as close as possible to timings when imaging is actually performed; for example, when the imaging device is started up (when the power supply is turned on), after switching into an imaging mode that performs synchronized imaging, and the like. In consideration of the difficulty of receiving the electromagnetic waves when inside buildings, it is desirable to carry this out to some excess in periods in which the electromagnetic waves can be received.

First, the flow of the synchronized imaging processing that is executed by the imaging device 10A is described.

In step S1, the imaging control section 41 resets the counter value of the frame counter stored in the storage section 20.

In step S2, the imaging start signal generation section 42a waits for the output of a GPS pulse by the GPS device 23.

In step S3, when a GPS pulse is outputted by the GPS device 23, the imaging start signal generation section 42a immediately (i.e., before the next GPS pulse is outputted) generates the synchronized imaging instruction signal that initiates the start of the live preview imaging processing (the imaging start signal), and works in conjunction with the transmission and reception control section 43 to transmit the imaging start signal to the imaging device 10B.

In step S4, the TG 24 is controlled by the CPU 11 and starts the generation of the frame synchronization signal to match the next GPS pulse outputted by the GPS device 23 (i.e., 1 second later). In addition, in this step, the imaging control section 41 executes the live preview imaging processing and the live preview display processing in synchronization with the generation of the frame synchronization signal by the TG 24.

In step S5, the imaging control section 41 makes a determination as to whether the end of the live preview imaging processing has been selected, by an instruction operation of the operation section 18 by a user. If it is determined that the end has been selected (affirmative), the present processing ends. If it is determined that the end has not been selected (negative) the processing advances to step S6.

In step S6, each time the frame synchronization signal is generated by the TG 24, the imaging control section 41 causes the imaging section 17 to output one frame of image data.

In step S7, the imaging control section 41 resets the frame counter stored in the storage section 20 in accordance with the start of synchronized imaging or, each time one frame of image data is outputted from the imaging section 17, increments the counter value of the frame counter, which is the recording instruction frame number.

In step S8, the imaging control section 41 updates the storage address of the image data in the ring buffer of the storage section 20 to the next address.

In step S9, the image recording instruction signal generation section 42b makes a determination as to whether the shutter button of the operation section 18 has been fully pressed by a user. If it is determined that the shutter button has been fully pressed (affirmative), the processing advances to step S10. If it is determined that the shutter button has not been fully pressed (negative), the processing returns to step S5.

In step S10, the image recording instruction signal generation section 42b generates the synchronized imaging instruction signal (image recording instruction signal), which is a signal including the counter value when the shutter button is fully pressed (the recording instruction frame number), to initiate the storage of image data, and the image recording instruction signal generation section 42b works in conjunction with the transmission and reception control section 43 to transmit the image recording instruction signal to the imaging device 10B.

For the counter value included in the image recording instruction signal, it is standard to use the counter value when the shutter button is fully pressed. However, using a counter value from a predetermined duration before the timing at which the shutter button is fully pressed or a counter value from a predetermined duration after the shutter button is fully pressed may be instructed or may be specified in advance.

In step S11, the imaging control section 41 reads the image data of the frame indicated by the recording instruction frame number from the ring buffer of the storage section 20 and records the image data to the removable medium 31.

Now, the flow of the synchronized imaging processing executed by the imaging device 10B is described.

The processing of step S21 is the same as in step S1.

In step S23, the imaging start signal generation section 42a works in conjunction with the transmission and reception control section 43 to receive the imaging start signal from the imaging device 10A.

In step S24, after the imaging start signal is received, the TG 24 starts the generation of the frame synchronization signal, matching a GPS pulse outputted by the GPS device 23. In addition, in this step, the imaging control section 41 executes the live preview imaging processing and the live preview display processing in synchronization with the generation of the frame synchronization signal by the TG 24.

The processing in step S25 to step S28 is the same as in step S5 to step S8, respectively.

In step S30, the image recording instruction signal generation section 42b works in conjunction with the transmission and reception control section 43 to make a determination as to whether the image recording instruction signal has been received from the imaging device 10A. If it is determined that the image recording instruction signal has been received (affirmative), the processing advances to step S31, and if it is determined that the image recording instruction signal has not been received (negative), the processing returns to step S25.

In step S31, the imaging control section 41 reads the image data corresponding to the counter value (recording instruction frame number) included in the image recording instruction signal received from the imaging device 10A, from the ring buffer of the storage section 20, and stores the image data in the removable medium 31.

As described hereabove, the imaging devices 10A and 10B of the imaging system 1 according to the first embodiment are each provided with the imaging section 17, the GPS device 23, the image instruction signal generation section 42, the TG 24 and the imaging control section 41.

The imaging section 17 images an object and outputs image data.

The GPS device 23 receives GPS signals acting as time references from the GPS satellite 100.

The TG 24 generates a periodic frame synchronization signal to match the timings at which the GPS signals acting as time references are received from the GPS satellite 100.

The imaging start signal generation section 42a generates a synchronized imaging instruction signal (imaging start signal) that initiates the start of live preview imaging processing by the imaging section 17.

When the imaging start signal generated by the imaging start signal generation section 42a at the imaging device 10A or 10B has been acquired, the imaging control section 41 sets timings of imaging by the imaging section 17 to match the frame synchronization signal generated by the TG 24.

Thus, the imaging devices 10A and 10B receive the GPS signals from the GPS satellite 100 and, on the basis of the commonly received GPS signals, output GPS pulses with a constant period. Then, for example, the imaging device 10A generates the synchronized imaging instruction signal (the imaging start signal) that initiates the start of the live preview imaging processing in accordance with a GPS pulse and transmits the imaging start signal to the imaging device 10B. The imaging device 10B receives this imaging start signal. The imaging devices 10A and 10B start the generation of frame synchronization signals in time with a GPS pulse and, when the imaging start signal is generated or received, set imaging timings to match the frame synchronization signals.

Consequently, the imaging devices 10A and 10B sequentially output sets of image data captured in time with the frame synchronization signals that are synchronized with the GPS signals that act as common reference times.

Thus, imaging timings at plural imaging devices may be more precisely synchronized.

Moreover, standard time information of times at which the GPS signals are generated is included in the GPS signals. On the basis of the standard time information included in the GPS signals and the timings of reception of the GPS signals, each TG 24 synchronizes with the standard times and generates the frame synchronization signal with a period specified in advance.

Thus, imaging may be performed at timings that are synchronized with the standard time information in accordance with the reception timings of the GPS signals.

After the imaging start signal generated by the imaging start signal generation section 42a of the imaging device 10A or 10B has been acquired, each imaging control section 41 sets a synchronized imaging timing of image data by the imaging section 17, matching the timing at which the frame synchronization signal is first outputted by the TG 24.

Thus, the timings may be synchronized and imaging performed promptly after the imaging start signal is generated.

Moreover, each TG 24 generates the frame synchronization signal periodically, with a pre-specified time represented by the GPS signals (for example, the startpoint of a second) as a trigger.

Thus, the production of errors between the frame synchronization signals of the plural imaging devices may be prevented.

Moreover, each imaging control section 41 corrects the output timings of the frame synchronization signal, which is the reference for imaging timings, to match the timing at which the frame synchronization signal is first outputted by the TG 24 (that is, the timing at which a GPS pulse is first outputted) after the synchronized imaging instruction signal generated by the image instruction signal generation section 42 at that device or the other device is acquired, and sets the imaging timings of synchronized imaging by the imaging section 17 on the basis of the corrected frame synchronization signal.

Thus, an offset between the frame synchronization signals when imaging starts may be corrected.

Moreover, the synchronized imaging instruction signals include an imaging start signal that initiates the start of continuous imaging by each imaging control section 41. When the imaging control section 41 acquires the imaging start signal generated by the image instruction signal generation section 42 of that device or the other device, the imaging control section 41 causes the imaging section 17 to sequentially output sets of image data in time with the frame synchronization signal generated by the TG 24.

Thus, image data with synchronized imaging timings may be recorded at the plural imaging devices.

Moreover, the imaging devices 10A and 10B of the imaging system 1 according to the present embodiment are each further equipped with the image recording instruction signal generation section 42b.

When the shutter button is fully pressed by a user, the image recording instruction signal generation section 42b generates a synchronized imaging instruction signal (image recording instruction signal) that initiates the recording of image data.

Each time the frame synchronization signal is generated by the TG 24, the imaging control section 41 increments the counter value of the frame counter stored in the storage section 20 in time with the frame synchronization signal.

Moreover, the imaging control section 41 associates the image data sequentially outputted by the imaging section 17 with the counter values of the frame counter and sequentially stores the same temporarily in the ring buffer of the storage section 20.

The image recording instruction signal generation section 42b includes the counter value of the image data in the image recording instruction signal.

When an image recording instruction signal is generated by the image recording instruction signal generation section 42b of the imaging device 10A or 10B, each imaging control section 41 reads the image data corresponding to the counter value included in the image recording instruction signal from the ring buffer of the storage section 20, and stores the image data in the removable medium 31.

Thus, the imaging devices 10A and 10B may specify image data that has been sequentially outputted and stored, with a counter value of the frame counters that are incremented by the frame synchronization signals that are synchronized with one another, and record the specified image data. The respective sets of image data specified and recorded with the same counter value at the imaging devices 10A and 10B are, for example, displayed side by side at a device that displays image data. Thus, a user may simultaneously view plural images that have been imaged from different angles by synchronized imaging with improved precision between the plural imaging devices.

Each imaging control section 41 may read, from the ring buffer of the storage section 20, the image data corresponding to a counter value that is decremented by a predetermined number from the frame counter value included in the image recording instruction signal or a counter value that is incremented by a predetermined number from the frame counter counter value included in the image recording instruction signal, and record this image data in the removable medium 31.

Thus, the imaging devices 10A and 10B may record image data from a number of frames before the time when the shutter button is fully pressed or may record image data from a number of frames after the time when the shutter button is fully pressed.

Each TG 24 receives the GPS pulses at predetermined intervals, and each time the TG 24 receives a GPS pulse, the TG 24 corrects and outputs the frame synchronization signal.

Thus, the frame synchronization signals at the plural imaging devices may be more precisely synchronized.

Each TG 24 receives the GPS pulses when the imaging device is started up and when the imaging device is switched into an imaging mode, and corrects and outputs the frame synchronization signal in accordance with the received GPS signals.

Thus, when synchronized imaging is performed at the plural imaging devices, the imaging timings may be corrected with suitable timings based on GPS signals that can be received in common.

The synchronization signals, which are synchronized with the standard time and have a pre-specified period, are outputted in 1/100 second units from the startpoint of each second.

Thus, the imaging timings may be more accurately synchronized between the plural imaging devices.

Second Embodiment

In the following, a second embodiment of the present invention will be explained with reference to the drawings.
Structure The imaging system 1 according to the second embodiment of the present invention has the same system structure as in the first embodiment.

That is, FIG. 1 also shows a system structure of the imaging system 1 in accordance with the second embodiment.

Because the system structure of FIG. 1 has already been described, no description thereof is given here.

Figure 6:
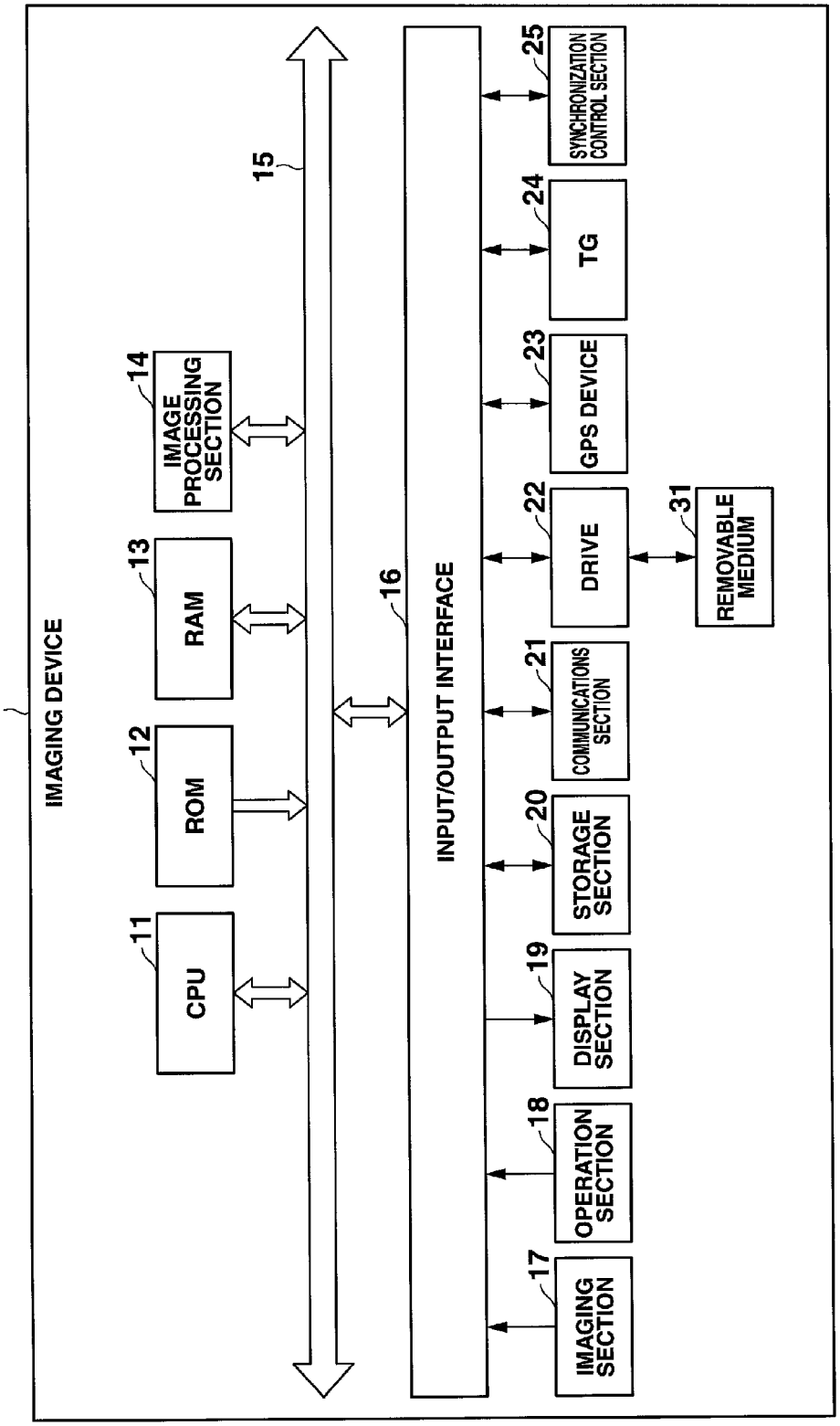
FIG. 6 is a block diagram showing hardware structures of a second embodiment of the imaging device in accordance with the present invention.

FIG. 6 is a block diagram showing hardware structures of each imaging device 10 in accordance with the second embodiment.

The same as in the first embodiment illustrated in FIG. 2, the imaging device 10 according to the second embodiment is equipped with the elements from the CPU 11 to the TG 24. Because the elements from the CPU 11 to the TG 24 have already been described with reference to FIG. 2, no description thereof is given here.

The imaging device 10 according to the second embodiment is further equipped with a synchronization control section 25. Herebelow, the synchronization control section 25 is described with reference where appropriate to FIG. 7 and FIG. 8.

Figure 7:
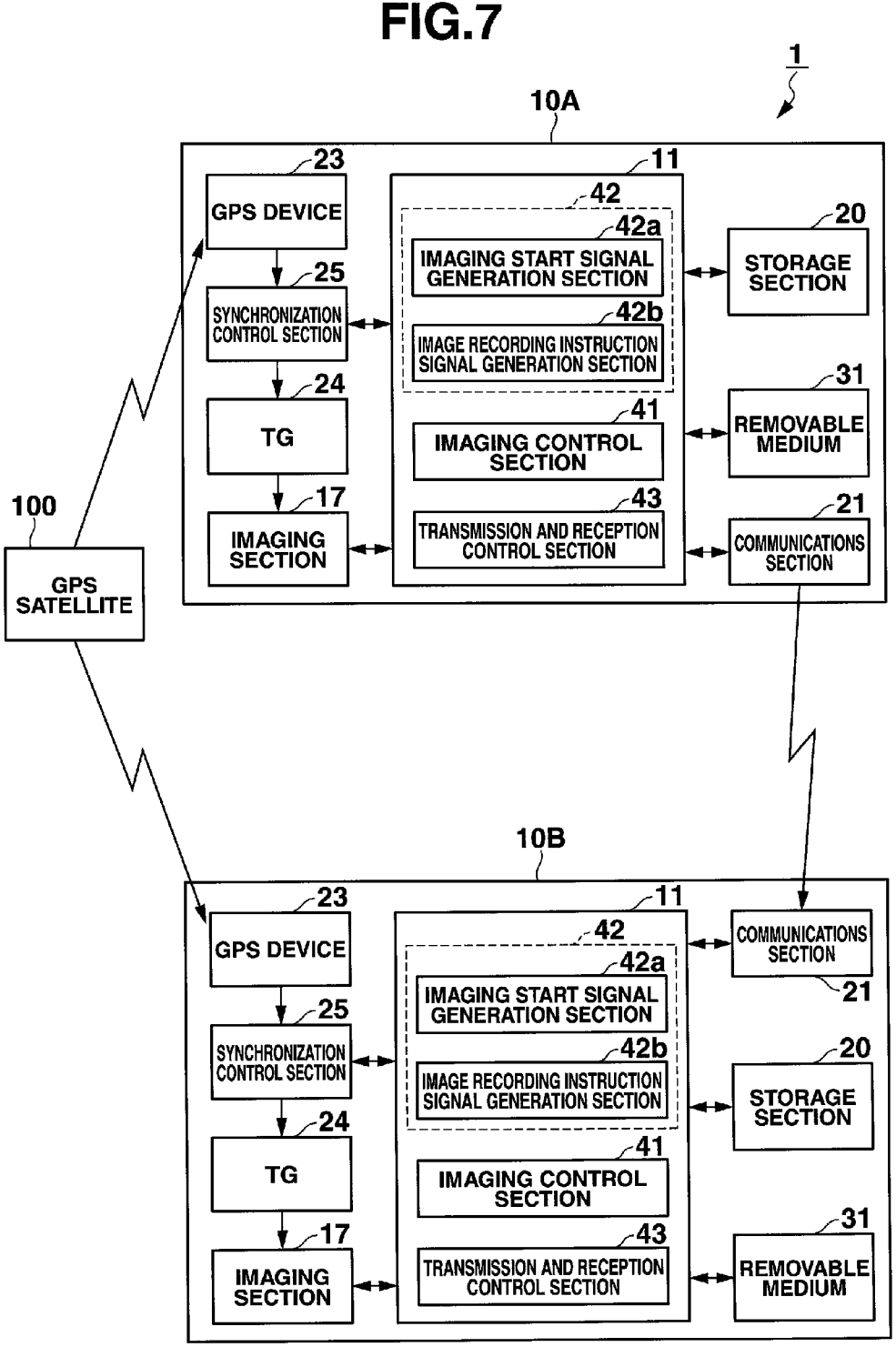
FIG. 7 is a functional block diagram showing functional structures for the execution of synchronized imaging processing by the imaging system in accordance with the second embodiment.

FIG. 7 is a functional block diagram showing functional structures for the execution of synchronized imaging processing by the imaging system 1 in accordance with the second embodiment.

Comparing the functional structures of the second embodiment shown in FIG. 7 with the functional structures of the first embodiment shown in FIG. 4, in the first embodiment control of the TG 24 is implemented by the CPU 11 executing predetermined software, and in the second embodiment control of the TG 24 is implemented by the synchronization control section 25 configured as hardware.

That is, the second embodiment functionally differs from the first embodiment in that the synchronization control section 25 is provided between the GPS device 23 and the TG 24 and the TG 24 is controlled by the synchronization control section 25.

Accordingly, of the functional structures of the imaging system 1, differences from the first embodiment are mainly described herebelow and similarities with the first embodiment are not described, as appropriate.

The same as in the first embodiment, the imaging section 17 according to the second embodiment performs imaging to match frame synchronization signals generated by the TG 24 and sequentially outputs the image data that is consequently obtained.

More specifically, the frame synchronization signals in this embodiment are structured by a clock signal, a horizontal synchronization signal and a vertical synchronization signal.

In each of the imaging devices 10A and 10B, the respective imaging timings are precisely synchronized by the timings of generation of the frame synchronization signals by the TGs 24 being controlled by the respective synchronization control sections 25.

Herebelow, the TG 24 and synchronization control section 25 according to the second embodiment are described in detail with reference to FIG. 8.

Figure 8:
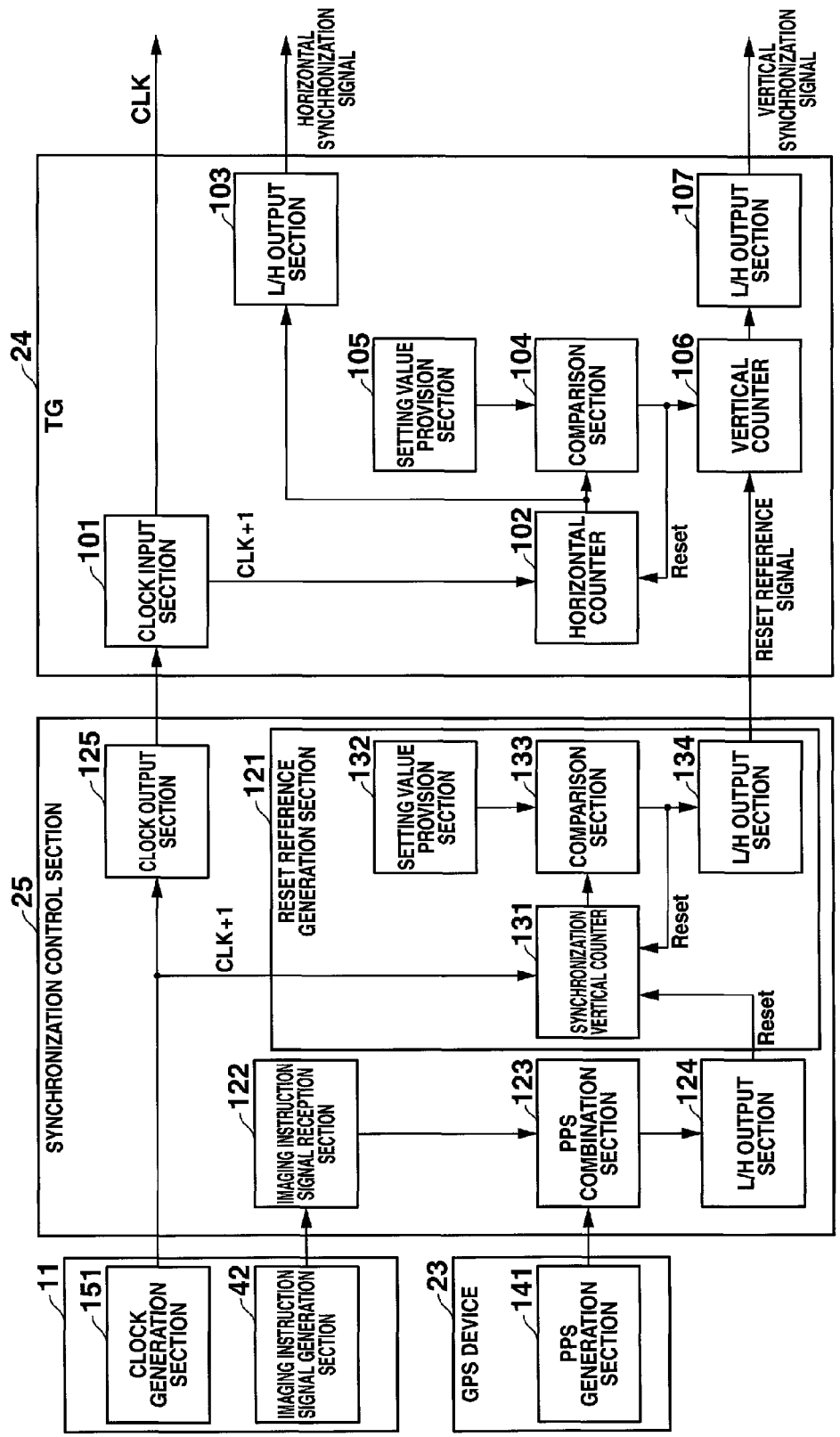
FIG. 8 is a functional block diagram showing detailed functional structures of a synchronization control section of the imaging system in FIG. 7.

FIG. 8 is a functional block diagram showing detailed functional structures of the TG 24 and synchronization control section 25 in accordance with the second embodiment.

In the second embodiment, the TG 24 and synchronization control section 25 are structured as hardware. Therefore, the respective functional blocks are structured by hardware such as electronic circuits and the like. Thus, FIG. 8 may be understood as being a circuit structure diagram of the TG 24 and synchronization control section 25 according to the second embodiment.

As shown in FIG. 8, the TG 24 is provided with a clock input section 101, a horizontal counter 102, an L/H (low/high) output section 103, a comparison section 104, a setting value provision section 105, a vertical counter 106 and an L/H output section 107.

The clock input section 101 inputs a clock signal CLK generated by a clock generation section 151 in the CPU 11, via a clock output section 125 in the synchronization control section 25, provides the clock CLK to the horizontal counter 102, and outputs the clock CLK to the imaging section 17 to serve as one of the frame synchronization signals.

The horizontal counter 102 is a counter for output control of the horizontal synchronization signal, increments a count value by 1 each time the clock CLK is provided from the clock input section 101, and provides the count value to the L/H output section 103 and the comparison section 104.

The L/H output section 103 generates the horizontal synchronization signal, which is at a high level (H) when the count value of the horizontal counter 102 is the same as a setting value and is at a low level (L) when the count value of the horizontal counter 102 is different from the setting value. The L/H output section 103 outputs the horizontal synchronization signal to the imaging section 17 to serve as one of the frame synchronization signals. That is, the horizontal synchronization signal is at the low level while the count value of the horizontal counter 102 is lower than the setting value, goes to the high level at a timing when the count value is the same as the setting value, and returns to the low level thereafter when the count value is reset. Therefore, pulses that rise at timings when the count value of the horizontal counter 102 is the same as the setting value are provided to the imaging section 17 as the horizontal synchronization signal.

The comparison section 104 compares the count value of the horizontal counter 102 with the setting value provided from the setting value provision section 105 and, for example, provides a pulse to the horizontal counter 102 and the vertical counter 106 when the count value and the setting value are the same. When the horizontal counter 102 is provided with a pulse from the comparison section 104, the horizontal counter 102 resets the count value thereof.

The vertical counter 106 is a counter for output control of the vertical synchronization signal. Each time a pulse is provided from the comparison section 104, which is to say, each time the count value of the horizontal counter 102 is the same as the setting value (the value provided by the setting value provision section 105), the vertical counter 106 increments a count value thereof by 1. The vertical counter 106 provides this count value to the L/H output section 107.

The L/H output section 107 generates the vertical synchronization signal, which is at the high level (H) when the count value of the vertical counter 106 is the same as a setting value and is at the low level (L) in other cases. The L/H output section 107 outputs the vertical synchronization signal to the imaging section 17 to serve as one of the frame synchronization signals. That is, the vertical synchronization signal is at the low level while the count value of the vertical counter 106 is lower than the setting value, goes to the high level at a timing when the count value is the same as the setting value, and returns to the low level thereafter when the count value is reset. Therefore, pulses that rise at timings when the count value of the vertical counter 106 is the same as the setting value are provided to the imaging section 17 as the vertical synchronization signal.

In an ordinary conventional timing generator, a comparison section for resetting a vertical counter is incorporated therein. That is, when a count value of a vertical counter is compared with a setting value by the comparison section in a conventional timing generator and it is determined that the values are the same, the vertical counter is reset. This resetting operation is conventionally executed separately at each of plural imaging devices. As a result, it is extremely difficult to synchronize imaging timings between the plural imaging devices.

In contrast, resetting of the vertical counter 106 in the TG 24 of this second embodiment is performed on the basis of a reset reference signal provided from the synchronization control section 25 that is outside the TG 24, as shown in FIG. 8. This reset reference signal is generated on the basis of a PPS signal (GPS pulses at one second intervals) generated by a PPS generation section 141 of the GPS device 23. This PPS signal can boast a very high time precision of within 500 ns, and may be used as a signal representing common reference times in the imaging devices 10A and 10B.

The respective synchronization control sections 25 of the imaging devices 10A and 10B generate the reset reference signals on the basis of these very high precision PPS signals, and output the reset reference signals to the respective TGs 24 in synchronization. Accordingly, the respective TGs 24 of the imaging devices 10A and 10B reset the vertical counters 106 in synchronization. Hence, the frame synchronization signals are generated in synchronization. Therefore, the respective imaging sections 17 of the imaging devices 10A and 10B perform respective imaging operations to match frame synchronization signals that are synchronized by the PPS signals representing common reference times.

Thus, the imaging timings of the imaging devices 10A and 10B may be more precisely synchronized.

Herebelow, structures of the synchronization control section 25 that implements this highly precise synchronization are described in detail with reference to FIG. 8.

As shown in FIG. 8, the synchronization control section 25 is provided with a reset reference generation section 121, an imaging instruction signal reception section 122, a PPS combination section 123, an L/H output section 124 and the clock output section 125.

The reset reference generation section 121 is provided with a synchronization vertical counter 131, a setting value provision section 132, a comparison section 133 and an L/H output section 134.

The synchronization vertical counter 131 increments a count value by one each time the clock CLK is generated by the clock generation section 151, and provides the count value to the comparison section 133.

The comparison section 133 compares the count value of the synchronization vertical counter 131 with a setting value provided from the setting value provision section 132 and, for example, provides a pulse to the L/H output section 134 and the synchronization vertical counter 131 when the count value and the setting value are the same. When the synchronization vertical counter 131 is provided with a pulse from the comparison section 133, the synchronization vertical counter 131 resets the count value thereof.

The L/H output section 134 generates the reset reference signal, which is at the high level (H) when the result of the comparison at the comparison section 133 is that the count value is the same as the setting value and is at the low level (L) in other cases. The L/H output section 134 provides the reset reference signal to the vertical counter 106 of the TG 24. That is, the reset reference signal is at the low level while the count value of the synchronization vertical counter 131 is lower than the setting value (while the comparison result is that the count value is different from the setting value), goes to the high level at a timing when the count value is the same as the setting value, and returns to the low level thereafter when the count value is reset. Therefore, pulses that rise at timings when the count value of the synchronization vertical counter 131 is the same as the setting value (timings when this is determined by the comparison section 133) are provided to the vertical counter 106 of the TG 24 as the reset reference signal. When the vertical counter 106 receives the reset reference signal (i.e., at rise timings of the pulses), the vertical counter 106 resets the count value thereof.

Reset timings of the synchronization vertical counter 131 include both the above-mentioned timings at which the comparison result of the comparison section 133 is that the count value is the same as the setting value (corresponding to timings of respective frames) and timings for attaining synchronization with the other imaging device 10. The reset timings for attaining synchronization are controlled by the imaging instruction signal reception section 122, the PPS combination section 123 and the L/H output section 124.

The imaging instruction signal reception section 122 receives an imaging instruction signal generated by the image instruction signal generation section 42.

Specifically, in the second embodiment, the operation section 18 (see FIG. 6) of the master side imaging device 10A is operated and the start of synchronized imaging is instructed. (The synchronized imaging that is instructed may be, besides a single execution of still image capture, the start of successive imaging or the start of video imaging, the start of imaging for a live preview display, switching of an imaging mode in accordance with the live preview display, or the like.) When the start of synchronized imaging is instructed, the imaging start signal generation section 42a of the image instruction signal generation section 42 (see FIG. 7), if operating at the master side, generates the imaging start signal, works in conjunction with the transmission and reception control section 43 (see FIG. 7) to transmit the imaging start signal to the other imaging device 10B, and provides the imaging start signal to the imaging instruction signal reception section 122 of the synchronization control section 25. Thus, the imaging instruction signal reception section 122 operating at the master side receives the imaging start signal.

The imaging start signal generation section 42a, if operating at the slave side, works in conjunction with the transmission and reception control section 43 to receive the imaging start signal from the other imaging device 10A, and provides the imaging start signal to the imaging instruction signal reception section 122 of the synchronization control section 25. Thus, the imaging instruction signal reception section 122 operating at the slave side also receives the imaging start signal.

The PPS combination section 123 combines the PPS signal generated by the PPS generation section 141 of the GPS device 23 with imaging instruction signals (imaging start signals) received by the imaging instruction signal reception section 122.

That is, the PPS combination section 123 combines the signals so as to output the PPS signal (a pulse every 1 second) only while the imaging instruction signal (imaging start signal) is being outputted (while the imaging instruction signal is at an active level). In other words, the PPS combination section 123 combines the signals to obtain the logical product thereof. Thus, an imaging instruction signal (imaging start signal) that is synchronized with the PPS signal is outputted.

The L/H output section 124 generates a reset signal, which is at the high level (H) when the PPS signal (high-level parts of the GPS pulses) is combined with the imaging instruction signal, and is at the low level (L) in other cases. The L/H output section 124 provides the reset signal to the synchronization vertical counter 131. When the synchronization vertical counter 131 is provided with the reset signal from the L/H output section 124, the synchronization vertical counter 131 resets the count value thereof.

Thus, after operation timings of the TG 24 are corrected, an actual imaging operation is started in accordance with the details of the synchronized imaging instructed by the imaging instruction signal (imaging start signal).

Specifically: when a single execution of still image capture is instructed by the imaging instruction signal (the imaging start signal), one set of synchronized still images are imaged and the data thereof is recorded; when the start of successive imaging is instructed, plural sets of synchronized still images are imaged and the respective data sets thereof are recorded; and when the start of video imaging is instructed, synchronized video images are imaged and the data thereof is recorded. When the start of imaging for live preview display, switching to an imaging mode in accordance with the live preview display, or the like is instructed, imaging operations for live preview display are commenced.

As described hereabove, after the operation section 18 (see FIG. 6) of the master side imaging device 10A is operated and the start of synchronized imaging is instructed (i.e., after the imaging start signal is outputted), when the PPS signal (high-level part of a GPS pulse) is next outputted, the count value of the synchronization vertical counter 131 in each of the imaging devices 10A and 10B is reset. After the operation timings of the TGs 24 are corrected by the resets, the imaging operation whose details are instructed is started. As mentioned above, the time precision of the PPS signals is very high at less than 500 ns. Therefore, the reset timings of the respective synchronization vertical counters 131 of the imaging devices 10A and 10B match with a very high precision of within 500 ns. Hence, the respective synchronization vertical counters 131 of the imaging devices 10A and 10B may perform their count operations in synchronization.

As described above, the reset reference signal for resetting each vertical counter 106 is generated on the basis of counting operations of the synchronization vertical counter 131. The respective synchronization control sections 25 of the imaging devices 10A and 10B output the reset reference signals to the respective TGs 24 in synchronization, in accordance with the very high precision PPS signals. Therefore, as mentioned above, the imaging timings of the imaging devices 10A and 10B may be synchronized with higher precision.

Now, when an operation mode switching switch of the operation section 18 (see FIG. 6) of the master side imaging device 10A is operated to switch the imaging device 10A into an imaging mode and start live preview display, and subsequently the shutter button is fully pressed, whether or not the synchronization vertical counters 131 are reset in this case may be an arbitrary matter. That is, similarly to the first embodiment, there is no need to execute a new reset of each synchronization vertical counter 131 at the time at which the shutter button is fully pressed, provided the synchronization vertical counter 131 has already been reset at the timing of switching into the imaging mode. Further, similarly to the first embodiment, if the image data of frames imaged in the course of live preview display processing is stored in the ring buffer, the imaging control section 41 may read image data of the frame indicated by a recording instruction frame number from the ring buffer and record this image data to the removable medium 31.

On the other hand, if the shutter button is fully pressed in a state in which imaging operations for live preview display have not been started, or if image data of a frame imaged after the shutter button is fully pressed in a state in which imaging operations for live preview display have not been started is to be recorded, or if a higher precision of synchronization is required or the like, the respective L/H output sections 124 of the imaging devices 10A and 10B may output the reset reference signals in synchronization at the timing at which the PPS signal (the high level part of a GPS pulse) is next outputted after the full press. In this case, the respective count values of the synchronization vertical counters 131 of the imaging devices 10A and 10B are reset after the full press. Hence, as described above, the respective synchronization control sections 25 of the imaging devices 10A and 10B output the reset reference signals in synchronization to the respective TGs 24 in accordance with the very high precision PPS signals. Thus, imaging timings of the imaging devices 10A and 10B after a full press may be synchronized with even higher precision.

Hereabove, the structures of the imaging device 10 according to the second embodiment are described with the emphasis on differences from the structures of the first embodiment.

Next, the synchronized imaging processing of the imaging system 1 according to the second embodiment is described.

The synchronized imaging processing according to the second embodiment is basically the same as in the first embodiment but is slightly different.

Accordingly, of the synchronized imaging processing of the imaging system 1 according to the second embodiment, only differences from the first embodiment are described herebelow and no descriptions are given of similarities with the first embodiment, as appropriate.

In the second embodiment as described above, an actual imaging operation in accordance with the details of synchronized imaging instructed by an imaging instruction signal (imaging start signal) would be started after the operation timings of the TGs 24 are corrected. Here, however, to simplify comparison with the first embodiment, it is assumed that the imaging start signal instructs the start of live preview imaging processing.

First, the flow of the synchronized imaging processing executed by the imaging device 10A according to the second embodiment is described.

The imaging control section 41 resets the counter value of the frame counter stored in the storage section 20 (corresponding to step S1 of FIG. 5). Hence, in the second embodiment, without waiting for the output of GPS pulses (the PPS signal) (i.e., without executing the processing of step S2 in FIG. 5), the imaging start signal generation section 42a generates an imaging instruction signal (imaging start signal) that initiates the start of live preview imaging processing by the imaging section 17, and works in conjunction with the transmission and reception control section 43 to transmit the imaging start signal to the imaging device 10B (corresponding to step S3 in FIG. 5).

When the PPS signal (the high-level part of a GPS pulse) is next outputted after this imaging start signal has been generated, the count value of the synchronization vertical counter 131 is reset. Thereafter, the reset reference signal is outputted from the synchronization control section 25, and the TG 24 resets the vertical counter 106. Then the TG 24 starts the generation of the frame synchronization signals (the horizontal synchronization signal, the vertical synchronization signal and the clock CLK) (corresponding to step S4 in FIG. 5). Similarly to the first embodiment, the imaging control section 41 executes the live preview imaging processing and the live preview display processing simultaneously with the generation of the frame synchronization signals by the TG 24.

Thereafter, processing the same as in the first embodiment is executed. In other words, the same processing as in steps S5 to S11 of FIG. 5 is executed in the second embodiment too.

However, if image data of a frame that is imaged after the full press is the target of recording and the precision of synchronization should be raised, then, as described above, the count value of the synchronization vertical counter 131 may be reset at the point when the PPS signal (the high-level part of a GPS pulse) is next outputted after the full press has been performed by a user, and then the reset reference signal is outputted from the synchronization control section 25.

As described hereabove, the imaging devices 10A and 10B of the imaging system 1 in accordance with the second embodiment are each provided with the imaging section 17, the GPS device 23, the image instruction signal generation section 42, the TG 24, the imaging control section 41 and the synchronization control section 25.

The imaging section 17 images an object and outputs image data.

The GPS device 23 receives GPS signals from the GPS satellite 100, and generates PPS signals that act as time references on the basis of the GPS signals.

The imaging start signal generation section 42a generates a synchronized imaging instruction signal (imaging start signal) that initiates the start of live preview imaging processing by the imaging section 17.

The TG 24 includes the vertical counter 106 and, on the basis of the count value of the vertical counter 106, generates the vertical synchronization signal that is one of the periodic frame synchronization signals.

The imaging control section 41 sets the timings of imaging by the imaging section 17 to match the frame synchronization signals generated by the TG 24.

The synchronization control section 25 includes the synchronization vertical counter 131 and, by controlling the synchronization vertical counter 131, generates the reset reference signal for resetting the vertical counter 106 of the TG 24.

After the imaging start signal generation section 42a of that device or the other device acquires the generated synchronized imaging instruction signal (imaging start signal), the synchronization control section 25 executes control to reset the synchronization vertical counter 131, matching a timing at which the GPS device 23 outputs the PPS signal.

Thus, the reset timings of the respective synchronization vertical counters 131 of the imaging devices 10A and 10B match up with a very high precision equivalent to the time precision of the GPS signals (within 500 ns).

Hence, the respective synchronization vertical counters 131 of the imaging devices 10A and 10B may perform their count operations in synchronization. The reset reference signals for resetting the vertical counters 106 are generated on the basis of the count operations of the synchronization vertical counters 131. The respective synchronization control sections 25 of the imaging devices 10A and 10B output the reset reference signals to the respective TGs 24 in synchronization, in accordance with the very high precision PPS signals. Thus, the imaging timings of the imaging devices 10A and 10B may be synchronized more precisely.

It should be noted that the present invention is not limited to the embodiments described above, and any modifications and improvements thereto within a scope that can realize the object of the present invention are included in the present invention.

In the first and second embodiments described hereabove, there is one slave side imaging device. However, this is not limiting and there may be an arbitrary number of slave side imaging devices.

In the first and second embodiments described hereabove, the master side imaging device and the slave side imaging device have identical hardware structures, but this is not limiting. The master side imaging device may have a structure specified for the transmission of signals and the slave side imaging device may have a structure specified for the reception of signals.

In the first and second embodiments described hereabove, as an example of the reference time signals that act as a reference for timings at which synchronized imaging processing is executed, the GPS signals transmitted from the GPS satellite 100 are used, but this is not limiting. For example, standard electromagnetic waves that are transmitted from transmission stations may be used as the reference time signals provided the signals are transmitted in accordance with accurate times.

However, if the synchronization control section 25 of the second embodiment is employed, very high precision is required for the reset timings of the vertical counters 106. In order to meet this requirement, it is excellent to employ the GPS signals transmitted from the GPS satellite 100, in which the time precision is extremely precise at less than 500 ns.

In the second embodiment described hereabove, the synchronization vertical counter 131 that generates the reset reference signal for resetting the vertical counter 106 of the TG 24 is provided at the synchronization control section 25, but this is not limiting. A synchronization horizontal counter that generates a reset reference signal for resetting the horizontal counter 102 of the TG 24 may also be provided.

Circuit structures in this case are not particularly limited. For example, although not shown in the drawings, the reset reference generation section 121 of the synchronization control section 25 may be provided with the synchronization vertical counter 131, the setting value provision section 132, the comparison section 133, and the L/H output section 134 the same as in the second embodiment for resetting the vertical counter 106 of the TG 24, and a synchronization horizontal counter, a setting value provision section, a comparison section and an L/H output section may be provided for resetting the horizontal counter 102 of the TG 24. In this case, the clock CLK is inputted to the synchronization horizontal counter for resetting the horizontal counter 102 of the TG 24, and results of comparison between the horizontal counter 102 and the setting value by the comparison section are provided to the synchronization vertical counter 131. That is, the synchronization vertical counter 131 increments the counter value thereof by 1 when the counter value of the horizontal counter matches the setting value.

In the second embodiment described hereabove, the clock CLK is generated by the CPU 11, but this is not limiting. A phase-locked loop (PLL) circuit into which the PPS signal is inputted may be incorporated in the synchronization control section 25 and the clock CLK generated by this PLL circuit.

The synchronization control section 25 in which a PLL circuit is incorporated is not particularly limited to the second embodiment in FIG. 8 but may include a synchronization control section that incorporates a synchronization horizontal counter for resetting the horizontal counter 102 of the TG 24, as described above, and the like.

In the first and second embodiments described hereabove, the imaging control section 41 records image data corresponding to a pre-specified counter value (still image data), but this is not limiting. The imaging control section 41 may record image data corresponding to a pre-specified plural number of surrounding counter values (video data).

In the first and second embodiments described hereabove, examples are described in which the imaging devices 10A and 10B in which the present invention is employed are digital cameras, but this is not particularly limiting.

For example, the present invention may be generally applied to electronic devices with synchronized imaging functions. Specifically, the present invention is applicable to, for example, notebook computers, printers, television sets, video cameras, portable navigation devices, portable telephones, portable video game machines and so forth.

To summarize the above, imaging devices in which the present invention is employed, including the first and second embodiments described hereabove, may be provided with: an imaging section; a reception section that receives a GPS signal from a GPS satellite, the GPS signal including reference time information that is a reference of time; and an imaging control section that synchronizes a timing of imaging by the imaging section with a reference time on the basis of the reference time information included in the GPS signal received by the reception section.

Thus, an effect may be provided of imaging timings at the plural imaging devices being synchronized with higher precision.

An imaging device in which the present invention is employed may be further provided with: a synchronization signal generation section that generates a periodic synchronization signal synchronized with the reference time on the basis of the reference time information included in the GPS signal received by the reception section; and an imaging instruction section that instructs imaging, and when the imaging instruction section instructs imaging, the imaging control section may set the timing of imaging of image data by the imaging section to be synchronized with the synchronization signal generated by the synchronization signal generation section.

Thus, the effect of imaging timings at the plural imaging devices being synchronized with higher precision is even more remarkable.

In the imaging device in which the present invention is employed, the imaging instruction section may include an imaging instruction signal generation section that generates a synchronized imaging instruction signal that instructs imaging with the timing of imaging being synchronized between a plural number of the imaging device. In this case, when the imaging control section acquires the synchronized imaging instruction signal generated by the imaging instruction signal generation section of the present imaging device or another of the imaging devices, the imaging control section may set the timing of imaging of image data by the imaging section that is synchronized with each other imaging device to be synchronized with the synchronization signal generated by the synchronization signal generation section.

Thus, the effect of imaging timings at the plural imaging devices being synchronized with higher precision is even more remarkable.

In an imaging device in which the present invention is employed, if the imaging instruction signal generation section of the present imaging device generates the synchronized imaging instruction signal, the imaging control section may transmit the synchronized imaging instruction signal to each other imaging device to match a timing of generation of the synchronized imaging instruction signal, and if the synchronized imaging instruction signal is received from another of the imaging devices, the imaging control section may synchronize the timing of imaging between the present imaging device and each other imaging device by synchronizing the reception timing of the synchronized imaging instruction signal with the synchronization signal.

Thus, the effect of imaging timings at the plural imaging devices being synchronized with higher precision is even more remarkable.

In an imaging device in which the present invention is employed, the synchronization signal generation section may generate a first synchronization signal that is a periodic synchronization signal matching time transitions (for example, a clock) and a second synchronization signal that is a periodic synchronization signal matching a driving period of an imaging component (for example a vertical synchronization signal or a horizontal synchronization signal), and, when the reception section receives the GPS signal, the synchronization signal generation section may correct a timing of the first synchronization signal so as to be synchronized with the reference time on the basis of the reference time information included in the received GPS signal and correct a timing of the second synchronization signal so as to be synchronized with the reference time on the basis of the corrected timing of the first synchronization signal, and, when the imaging instruction section instructs imaging, the imaging control section may set the timing of imaging of image data by the imaging section to be synchronized with the second synchronization signal generated by the synchronization signal generation section.

Thus, the effect of imaging timings at the plural imaging devices being synchronized with higher precision is even more remarkable.

Furthermore, when the imaging instruction section instructs imaging, the synchronization signal generation section may correct the timing of the second synchronization signal so as to be synchronized with the reference time on the basis of the timing of the first synchronization signal, and, when the imaging control section acquires the synchronized imaging instruction signal, the imaging control section may cause imaging to be executed by the imaging section in synchronization with the timing of the second synchronization signal corrected by the synchronization signal generation section.

Thus, the effect of imaging timings at the plural imaging devices being synchronized with higher precision is yet more remarkable.

In other words, imaging devices in which the present invention is employed, including the first and second embodiments described hereabove, may be provided with: an imaging section; a reference time signal reception section that receives a reference time signal that is a reference of time from externally; an imaging control section that synchronizes a timing of imaging by the imaging section with a reference time on the basis of the reference time signal received by the reference time signal reception section; a synchronization signal generation section that generates a periodic synchronization signal synchronized with the reference time to match a timing at which the reference time signal reception section receives the reference time signal from externally; and an imaging instruction signal generation section that generates a synchronized imaging instruction signal that instructs imaging, the timing of imaging being synchronized, and, when the imaging control section acquires the synchronized imaging instruction signal generated by the imaging instruction signal generation section of the present imaging device or another of the imaging device, the imaging control section may set the synchronized timing of imaging of image data by the imaging section to match the synchronization signal generated by the synchronization signal generation section.

Thus, the effect of imaging timings at the plural imaging devices being synchronized with higher precision may be provided.

The processing sequence described above can be executed by hardware, and also can be executed by software.

That is, the functional structure in FIG. 4 is merely an example and is not particularly limiting. In other words, it is sufficient that the imaging devices 10A and 10B be provided with functions capable of executing the above-described sequence of processing as a whole; the kinds of functional blocks used for executing the functions are not particularly limited by the example in FIG. 4.

A single functional block may be configured by a single piece of hardware, a single installation of software, or any combination thereof.

In a case in which the processing sequence is to be executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

As well as the removable medium 31 in FIG. 2 that is distributed separately from the main body of the equipment for supplying the program to users, a recording medium containing such a program may be constituted by a recording medium that is supplied to users in a state of being incorporated in the main body of the equipment. The removable medium 31 is constituted by, for example, a magnetic disc (including floppy disks), an optical disc, a magneto-optical disc or the like. The optical disk is composed of a CD-ROM (Compact Disc-Read Only Memory), a DVD (Digital Versatile Disc), or the like, for example. The magneto-optical disk is composed of an MD (Mini-Disk) or the like. A recording medium that is supplied to users in a state of being incorporated in the main body of the equipment is constituted by, for example, the ROM 12 of FIG. 2, in which the program is saved, a hard disc included in the storage section 20 of FIG. 2, or the like.

It should be noted that, in the present specification, the steps describing the program recorded in the storage medium include not only the processing executed in series following this order, but also processing executed in parallel or individually that is not necessarily executed serially.

Moreover, the term "system" as used in the present specification is intended to include the whole of equipment constituted by plural devices, plural units and the like.

What is claimed is:

1. An imaging device comprising:
   an imaging section including an image sensor;
   a GPS device which receives a GPS signal from a GPS satellite, the GPS signal including reference time information that is a reference of time;
   a memory storing a program and a CPU which executes the program stored in the memory to configure the CPU to perform control to synchronize a timing of imaging by the imaging section with a reference time based on the reference time information included in the received GPS signal; and
   a synchronization signal generation circuit which generates a periodic synchronization signal synchronized with the reference time based on the reference time information included in the received GPS signal;
   wherein the CPU executes the program to be further configured to:
     instruct imaging,
     perform control to generate a synchronized imaging instruction signal that instructs imaging with the timing of imaging being synchronized between a plurality of the imaging devices, and
     set the synchronized timing of imaging of image data by the imaging section based on a timing at which the synchronization signal generation circuit first outputs the periodic synchronization signal after acquiring the synchronized imaging instruction signal generated by the present imaging device or another of the imaging devices.

2. The imaging device according to claim 1 wherein, if the CPU of the present imaging device generates the synchronized imaging instruction signal, the CPU transmits, under control of the program, the synchronized imaging instruction signal to each other imaging device to match a timing of generation of the synchronized imaging instruction signal, and if the synchronized imaging instruction signal is received from another of the imaging devices, the CPU synchronizes, under control of the program, the timing of imaging between the present imaging device and each other imaging device by synchronizing the reception timing of the synchronized imaging instruction signal with the synchronization signal.

3. The imaging device according to claim 1, wherein the GPS signal includes standard time information representing a standard time at which the GPS signal is generated, and
   wherein the synchronization signal generation circuit generates the periodic synchronization signal to be synchronized with the standard time based on the standard time information included in the GPS signal and a timing of reception of the GPS signal, a period of the synchronization signal being specified in advance.

4. The imaging device according to claim 1, wherein the synchronization signal generation circuit generates the synchronization signal periodically, the generation being initiated by the reference time specified by the GPS signal which is at pre-specified times.

5. The imaging device according to claim 1, wherein the CPU corrects, under control of the program, a timing of output of a frame synchronization signal, which is a reference for the timing of imaging, to match a timing at which the synchronization signal generation circuit first outputs the synchronization signal after acquiring the synchronized imaging instruction signal generated by the present imaging device or another of the imaging devices, and the CPU sets, under control of the program, the synchronized timing of imaging of image data by the imaging section based on the corrected frame synchronization signal.

6. The imaging device according to claim 1, wherein the synchronized imaging instruction signal includes an imaging start signal that initiates the start of successive imaging by the CPU, and
   wherein when the CPU acquires the generated imaging start signal generated by the present imaging device or another of the imaging devices, the CPU causes, under control of the program, the imaging section to sequentially output image data, matching the synchronization signal generated by the synchronization signal generation circuit.

7. The imaging device according to claim 5, wherein the synchronized imaging instruction signal includes an image recording instruction signal that initiates recording of data of an image imaged by the imaging section,
   wherein the CPU, under control of the program, increments a counter value, matching the frame synchronization signal, each time the corrected frame synchronization signal is generated, associates image data sequentially outputted by the imaging section with the counter values, and stores the image data and counter values in a storage,
   wherein the CPU includes, under control of the program, the counter value of the data of an image in the image recording instruction signal, and
   wherein when the CPU acquires the image recording instruction signal generated by the present imaging device or another of the imaging devices, the CPU reads, under control of the program, the image data corresponding to the counter value included in the image recording instruction signal from the storage and records this image data at a recording device.

8. The imaging device according to claim 7, wherein the CPU reads, under control of the program, the image data corresponding to one of a counter value that is decremented by a predetermined number from the counter value included in the image recording instruction signal and a counter value that is incremented by a predetermined number from the counter value included in the image recording instruction signal from the storage and records this image data at a recording device.

9. The imaging device according to claim 1, wherein the synchronization signal generation circuit receives the GPS signal at a predetermined interval, corrects the synchronization signal in accordance with the GPS signal each time the GPS signal is received, and outputs the synchronization signal.

10. The imaging device according to claim 1, wherein the synchronization signal generation circuit receives the GPS signal when the imaging device is started up and when the imaging device is switched to an imaging mode, corrects the synchronization signal in accordance with the received GPS signal, and outputs the synchronization signal.

11. The imaging device according to claim 1, wherein the synchronization signal is synchronized with the reference time and a period of the synchronization signal is specified in advance, the synchronization signal being outputted at each unit of one hundredth of a second from the startpoint of each second.

12. An imaging device comprising:
an imaging section including an image sensor;
a GPS device which receives a GPS signal from a GPS satellite, the GPS signal including reference time information that is a reference of time;
a memory storing a program and a CPU which executes the program stored in the memory to configure the CPU to perform control to synchronize a timing of imaging by the imaging section with a reference time based on the reference time information included in the received GPS signal; and
a synchronization signal generation circuit that generates a periodic synchronization signal synchronized with the reference time based on the reference time information included in the received GPS signal;
wherein the CPU executes the program to be further configured to:
instruct imaging, and
perform control to generate a synchronized imaging instruction signal that instructs imaging with the timing of imaging being synchronized between a plurality of the imaging devices,
wherein the synchronization signal generation circuit generates a first synchronization signal that is a periodic synchronization signal matching time transitions and a second synchronization signal that is a periodic synchronization signal matching a driving period of an imaging component, and, when the GPS signal is received, the synchronization signal generation circuit corrects a timing of the first synchronization signal so as to be synchronized with the reference time based on the reference time information included in the received GPS signal and corrects a timing of the second synchronization signal so as to be synchronized with the reference time based on the corrected timing of the first synchronization signal, and
wherein when the CPU instructs imaging, the CPU sets, under control of the program, the timing of imaging of image data by the imaging section to be synchronized with the second synchronization signal generated by the synchronization signal generation circuit.

13. The imaging device according to claim 12, wherein, when the CPU instructs imaging, the synchronization signal generation circuit corrects the timing of the second synchronization signal so as to be synchronized with the reference time based on the timing of the first synchronization signal, and
wherein when the CPU acquires the synchronized imaging instruction signal, the CPU causes, under control of the program, imaging to be executed by the imaging section in synchronization with the timing of the second synchronization signal corrected by the synchronization signal generation circuit.

14. An imaging device comprising:
an imaging section including an image sensor;
a GPS device which receives a GPS signal from a GPS satellite, the GPS signal including reference time information that is a reference of time;
a memory storing a grogram and a CPU which executes the grogram stored in the memory to configure the CPU to perform control to synchronize a timing of imaging by the imaging section with a reference time based on the reference time information included in the received GPS signal; and
a synchronization signal generation circuit that generates a periodic synchronization signal synchronized with the reference time based on the reference time information included in the received GPS signal;
wherein the CPU executes the program to be further configured to:
instruct imaging, and
perform control to generate a synchronized imaging instruction signal that instructs imaging with the timing of imaging being synchronized between a plurality of the imaging devices,
wherein the synchronization signal generation circuit includes a first counter and, by controlling the first counter, generates a vertical synchronization signal that is one signal of the synchronization signal, and
wherein the imaging device further includes a synchronization control circuit that includes a second counter and that, after the synchronization control circuit acquires the synchronized imaging instruction signal generated by the present imaging device or another of the imaging devices, generates a reset reference signal that resets the second counter, matching a timing at which the GPS signal is received.

15. The imaging device according to claim 14, wherein the synchronization signal generation circuit further includes a third counter and, by controlling the third counter, generates a horizontal synchronization signal that is one signal of the synchronization signal, and
wherein the synchronization control circuit further includes a fourth counter and, by controlling the fourth counter, generates a reset reference signal that resets the third counter, and resets the fourth counter at a timing at which the second counter is reset.

16. The imaging device according to claim 15, wherein the synchronization signal generated by the synchronization signal generation circuit further includes a clock, and
wherein the synchronization control circuit further includes a generation circuit that generates the clock based on the received GPS signal.

17. An imaging method executed by an imaging device provided with an imaging section that includes an image sensor, the imaging method comprising:
receiving a GPS signal from a GPS satellite, the GPS signal including reference time information that is a reference of time;

synchronizing a timing of imaging by the imaging section with a reference time based on the reference time information included in the received GPS signal;

generating a periodic synchronization signal synchronized with the reference time based on the reference time information included in the received GPS signal;

instructing imaging to be performed;

generating a synchronized imaging instruction signal that instructs imaging with the timing of imaging being synchronized between a plurality of the imaging devices; and setting the synchronized timing of imaging of image data by the imaging section based on a timing at which the periodic synchronization signal is first output after acquiring the synchronized imaging instruction signal generated by the present imaging device or another of the imaging devices.

18. A non-transitory computer readable storage medium having stored therein a program executable by a computer of an imaging device comprising an imaging section that includes an image sensor, the program causing the computer to execute functions comprising:

receiving a GPS signal from a GPS satellite, the GPS signal including reference time information that is a reference of time;

synchronizing a timing of imaging by the imaging section with a reference time based on the reference time information included in the received GPS signal;

generating a periodic synchronization signal synchronized with the reference time based on the reference time information included in the received GPS signal;

instructing imaging to be performed;

generating a synchronized imaging instruction signal that instructs imaging with the timing of imaging being synchronized between a plurality of the imaging devices; and setting the synchronized timing of imaging of image data by the imaging section based on a timing at which the periodic synchronization signal is first output after acquiring the synchronized imaging instruction signal generated by the present imaging device or another of the imaging devices.

19. An imaging device comprising:

an imaging section including an image sensor;

a synchronization signal generation circuit that generates a periodic synchronization signal with a predetermined precision;

a memory storing a program and a CPU which executes the program to configure the CPU to:
   perform control to generate an imaging instruction signal that instructs imaging with an arbitrary timing, and
   set a timing of imaging by the imaging section by synchronizing a generated imaging instruction signal with a periodic synchronization signal generated by the synchronization signal generation circuit;

a GPS device which receives a GPS signal from a GPS satellite, the GPS signal specifying reference time information that is a reference of time; and a synchronization control circuit which is configured to perform control to correct, with a higher precision than the predetermined precision, a difference of a timing of a periodic synchronization signal generated by the synchronization signal generation circuit based on a timing specified by the received GPS signal.

* * * * *

UNITED STATES PATENT AND TRADEMARK OFFICE
CERTIFICATE OF CORRECTION

| | | |
|---|---|---|
| PATENT NO. | : 9,154,696 B2 | Page 1 of 1 |
| APPLICATION NO. | : 13/845052 | |
| DATED | : October 6, 2015 | |
| INVENTOR(S) | : Jun Muraki et al. | |

It is certified that error appears in the above-identified patent and that said Letters Patent is hereby corrected as shown below:

In The Claims

Column 28, claim 14, line 6, delete "grogram" and insert --program--.

Column 28, claim 14, line 7, delete "grogram" and insert --program--.

Signed and Sealed this
Fifteenth Day of March, 2016

Michelle K. Lee
*Director of the United States Patent and Trademark Office*